M. C. SHARPNECK & J. H. LEE.
WAGON ATTACHMENT.
APPLICATION FILED APR. 24, 1912.

1,065,177.

Patented June 17, 1913.

Witnesses

Inventor
Matthew C. Sharpneck
John H. Lee,
By Victor J. Evans
Attorney

COLUMBIA PLANOGRAPH CO., WASHINGTON, D. C.

UNITED STATES PATENT OFFICE.

MATTHEW C. SHARPNECK, OF PRESCOTT, AND JOHN H. LEE, OF CORNVILLE, ARIZONA.

WAGON ATTACHMENT.

1,065,177.

Specification of Letters Patent.

Patented June 17, 1913.

Application filed April 24, 1912. Serial No. 693,011.

*To all whom it may concern:*

Be it known that we, MATTHEW C. SHARPNECK and JOHN H. LEE, citizens of the United States, residing at Prescott and Cornville, in the county of Yavapai and State of Arizona, have invented new and useful Improvements in Wagon Attachments, of which the following is a specification.

The general object of the invention is to prevent the wearing of the end portions of the rub plates of a vehicle, nearest to the side of the vehicle upon which the driver sits and which is subjected to the greatest strains in applying the brakes, in advance of the opposite end portions of the said rub plates; and to this end the invention consists in certain improved constructions, arrangements and combinations of devices, which will be fully described hereinafter and then pointed out in the claims.

Figure 1:
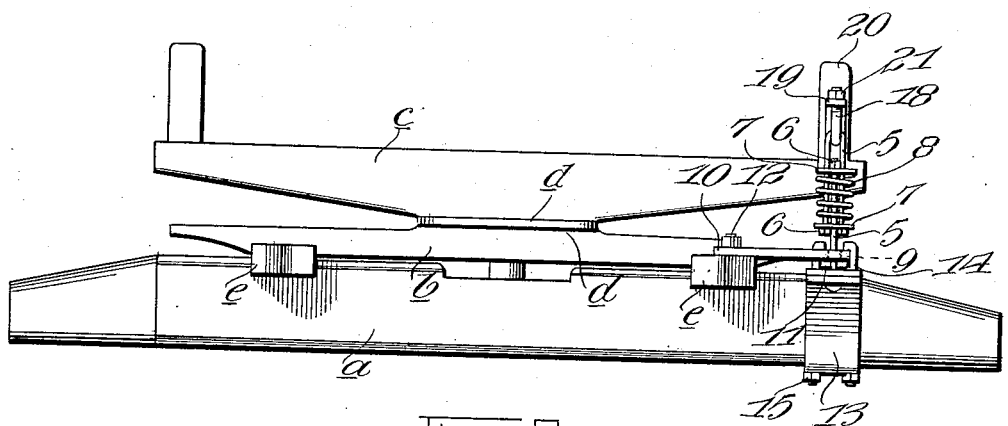
Figure 2:
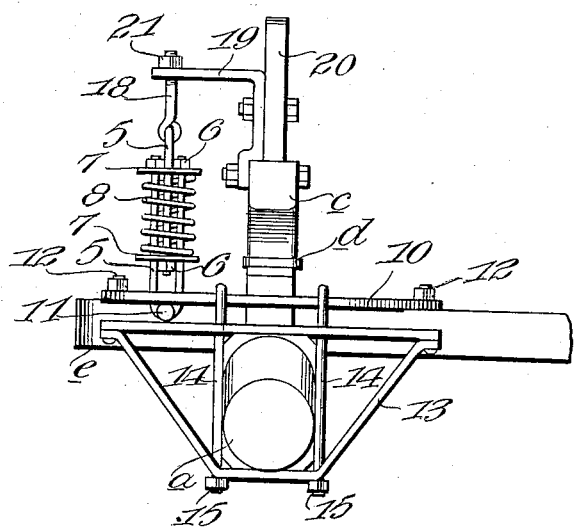

Other objects will appear and be better understood from that embodiment of our invention of which the following is a specification, reference being had to the accompanying drawings forming part hereof, in which;

Figure 1 is a front elevation of the device also showing a sufficient portion of a vehicle in front elevation to give an understanding of one application of the device. Fig. 2 is a side elevation of Fig. 1.

$a$, $b$, $c$, $d$—$d$, and $e$—$e$ indicate respectively, the axle tree, sand board, bolster, rub irons and hounds of ordinary construction.

In carrying out our invention we provide a suitable coupler which in the embodiment shown, consists of interfitting U-shaped elements 5—5, the ends of which have nuts 6—6 or the like, threaded thereon which form supports for plates 7—7 which confine between them a compression spring 8.

An angular-shaped slot 9 in a track iron 10 is made to loosely receive the lower of the said elements 5, the sides of this slot forming a guide for the element which is pinned against displacement from the track iron by means of a pin 11, having rollers which bear on the lower face of the track iron. The track iron 10 is by preference, connected to the hound $e$ which is on that side of the vehicle remote from the side upon which the driver sits and on which the brake lever is located. Suitable bolts and nuts designated generally by 12, connect the ends of the track iron to the hound and a bracket 13 carried by the axle tree $a$ has tie rods 14—14 extending therefrom and secured by means of nuts 15, these tie rods having their upper ends suitably adapted for bearing on opposite side portions of the track iron 10 and bracing it against upward swinging movement. Since the hounds, axle tree and track iron turn as a unit, the said track iron is of such shape so also is the slot 9, as to prevent the lower of the elements 5, from binding in the slot 9 during the turning of the vehicle.

The upper element 5 is connected to an eye bolt 18 which passes loosely through an opening in a bracket arm 19 bolted or otherwise suitably secured to the bolster $c$ and to an upright 20 which is also suitably secured to the bolster. The eye bolt 18 has screwed onto it a nut 21 which ties it to the bracket 19 and thus completes the coupling between the bolster and the axle tree $a$ through the track iron 10. Since the elements 5—5 of the coupling are yieldingly connected for relative longitudinal movements, the coupling will not prevent necessary lateral swaying of the vehicle body while the wheels are passing over an even road bed, but since the tension of the spring may be adjusted by turning the nut 21, it will be evident that when the ends of the rub irons nearest the side of the vehicle on which the driver sits, show wear which makes itself manifest by a tilting downwardly of the last-named side of the body, such turning of the nut in the proper direction will restore the body to its normal horizontal position.

In conclusion it may be stated that although we have shown and described our invention as consisting of means attached to one side portion of the vehicle to correct tilting of the opposite side thereof, nevertheless, we do not intend to limit ourselves to the specific arrangement of the parts shown and described nor to the use of one device for the purpose before stated. Future use may demonstrate that better results may be obtained by coupling the opposite sides of the vehicle to the opposite end portions of the axle tree and these at the opposite end portions of the wagon.

What we claim as new is:

1. A device of the class described comprising a coupling made up of U-shaped elements connected for relative longitudinal movement, plates carried by the elements, a spring interposed between said plates, a connection between one of said elements and the axle of a vehicle, and a connection between the other element and the body of the vehicle.

2. A device of the class described comprising a coupling made up of U-shaped elements connected for relative longitudinal movement, plates carried by the elements, a spring interposed between said plates, a connection between one of said elements and the axle of a vehicle, and adjustable means between the other element and the body of the vehicle for tensioning said spring.

In testimony whereof we affix our signatures in presence of two witnesses.

MATTHEW C. SHARPNECK.
JOHN H. LEE.

Witnesses to signature of Matthew C. Sharpneck:
HENRY T. ANDREWS,
A. M. CASPARI.

Witnesses to signature of John H. Lee:
M. A. RHEA,
J. P. GIRDNER.

Copies of this patent may be obtained for five cents each, by addressing the "Commissioner of Patents, Washington, D. C."